United States Patent Office 3,330,867
Patented July 11, 1967

3,330,867
OLEFINIC KETONES AND PROCESS FOR THE MANUFACTURE THEREOF
Gabriel Saucy, Riehen, Switzerland, assignor to Hoffmann-La Roche Inc., Nutley, N.J., a corporation of New Jersey
No Drawing. Filed June 21, 1963, Ser. No. 289,740
Claims priority, application Switzerland, June 28, 1962, 7,811/62
6 Claims. (Cl. 260—594)

The present invention relates to a process for the manufacture of olefinic ketones from allene-ketones.

The process of the invention is carried out by treating an allene-ketone of the formula

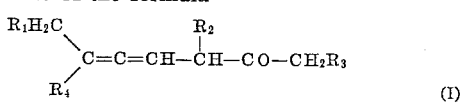

(I)

wherein $R_1$, $R_2$ and $R_3$ are hydrogen or lower alkyl groups and $R_4$ is a hydrocarbon residue (preferably containing 1 to 12 carbon atoms) which may be substituted by oxygen-containing groups (e.g. hydroxy, lower-alkoxy, or lower-acyloxy) and may—together with the neighbouring C-atom and the —$CH_2R_1$ group—form a carbocyclic radical, preferably a 5 to 7-membered carbocyclic radical (e.g. the cyclohexylidene group) with hydrogen in the presence of a hydrogenation catalyst until approximately one mole of hydrogen is reacted per mole of allene-ketone.

The term "lower" as used herein in connection with alkyl, alkoxy, and acyl is to be understood to mean groups having from 1 to 7 carbon atoms, and includes both straight and branch chain, e.g. methyl, ethyl, propyl, isopropyl, butyl, isobutyl, hexyl, and lower alkanoyl such as formyl, acetyl, propionyl, butyryl, and cyclic acyl groups such as benzoyl, etc.

Illustrative of $R_4$-substituents are saturated and unsaturated aliphatic hydrocarbon residues, preferably residues of the formula

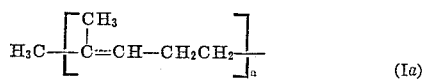

(Ia)

wherein $n$ is 0, 1, or 2, and the dotted bond can also be saturated, representing groups of the formula

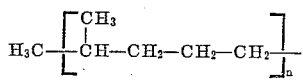

and groups of the formula

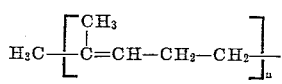

wherein $n$ is selected from 0, 1 and 2, for instance, methyl ($n=0$); 4-methyl-penten-(3)-yl, 4-methyl-pentyl ($n=1$); 4,8 - dimethyl - nonadien - (3,7) - yl, 4,8-dimethyl-nonyl ($n=2$); and residues of Formula Ia containing a hydroxy, lower-alkoxy, lower acyloxy (e.g. lower alkanoyloxy or benzoyloxy) or methyl substituent such as the following groups:

4-methyl-4-hydroxy-pentyl, 4-methyl-4-methoxy-pentyl, 4-methyl-4-acetoxy-pentyl; 4,8-dimethyl-8-hydroxy-nonen-(3)-yl, 4,8-dimethyl-8-ethoxy-nonen-(3)-yl, 4,8-dimethyl-8-acetoxy-nonen-(3)-yl; 3,4-dimethyl-penten-(3)-yl, 4,7,8-trimethyl-nonen-(3)-yl. $R_4$ may also be an araliphatic or aromatic hydrocarbon residue, e.g. benzyl or phenyl.

It has surprisingly been found that the hydrogenation of allene-ketones of Formula I in accordance with the invention proceeds with high selectivity to produce almost exclusively (or at least in highly predominant amounts) γ,δ-unsaturated ketones of Formula II

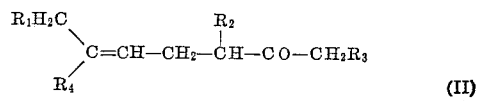

(II)

and only a small portion, if any, of β,γ-unsaturated ketones of Formula III

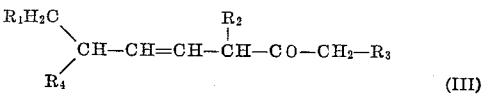

(III)

$R_1$ through $R_4$ in Formulas II through III have the same meaning as in the compounds of Formula I.

It has now been discovered that those hydrogenation catalysts which are useful for the partial hydrogenation of the acetylenic triple bond to the olefinic double bond with high selectivity (such as, for example, a palladium/calcium carbonate catalyst which has been poisoned with lead in the manner described by Lindlar in Helv. Chim. Acta 1953, 35, 446–450—see also U.S. Pat. 2,681,938), are preferred for use in the practice of the invention to selectively partially hydrogenate the allene-ketones of Formula I to the γ,δ-unsaturated ketones of Formula II. Other examples of catalyst that can be employed include palladium/carbon, palladium/barium sulfate (both of the foregoing preferably poisoned with lead) and Raney-nickel.

The hydrogenation reaction is adventageously effected in the presence of an organic solvent, especially of a nonpolar organic solvent such as, for example, hexane, heptane, benzene, toluene. A preferred solvent is petroleum ether. Methanol, acetone, tetrahydrofuran, dioxane and diisopropyl ether are other examples of solvents that can be employed in the practice of the invention. However, the hydrogenation reaction can also be carried out in the absence of a solvent.

The selectivity of the hydrogenation reaction can be further increased by the addition of a minor amount of an aliphatic or aromatic amine, e.g. quinoline, pyridine, triethylamine, piperidine, pyrrolidine, etc.

The hydrogenation advantageously can be carried out at room temperature and under normal pressure, although temperatures in the range of from about 0° C. to about 100° C., and pressures up to about 100 kg./cm.² can also be employed. When using catalysts of high selectivity (such as the Lindlar catalyst), the hydrogen uptake automatically comes to a standstill after the uptake of one mole of hydrogen. With less selectively acting catalysts, the reaction is interrupted after the uptake of the calculated amount of hydrogen.

The separation of products of Formula II from those of Formula III can be carried out by the standard techniques known to those skilled in the art, for example, by fractional distillation or by preparative gas chromatography.

The starting materials of Formula I, insofar as they are not known, can be prepared in a known manner (e. g., according to the process given in Chimia 14 (1960), 362; see also U. S. Pat. 3,029,287) by the reaction of a tertiary propargyl alcohol of the formula

(IV)

with an enol ether of the formula

(V)

The products of the process of the invention are useful as odorants for the compounding of perfume compositions. They are also useful as intermediate products for the manufacture of other perfume odorants. They are also useful as intermediate products for the manufacture of carotenoids and vitamins, such as vitamin $A_1$, $A_2$, E and K.

Example 1

31.1 g. of 6-methyl-4,5-heptadien-2-one are dissolved in 200 ml. of petroleum ether and, after the addition of 0.3 g. of Lindlar catalyst and 0.3 g. of quinoline, the mixture is hydrogenated at room temperature and normal pressure in a shaking apparatus. The hydrogenation almost comes to a standstill after the uptake of 5.6 liters of hydrogen (=1 mole equivalent $H_2$). (Time taken: 6 hours, wherein 5 liters of hydrogen are taken up in 2.5 hours). The catalyst is filtered off and the filtrate evaporated under vacuum. There is thus obtained a product ($n_D{}^{24}$=1.4405) which, according to a gas chromatogram, contains the following components: 87.9 percent 6-methyl-5-hepten-2-one; 11.9 percent 6-methyl-4-hepten-2-one; and 1 percent 6-methyl-2-heptanone.

The 6-methyl-4-hepten-2-one can be isolated by preparative gas chromatography in the form of a mixture (about 1:1) of the cis and trans isomers. B.P. 54–55°/11 mm.; $n_D{}^{23}$=1.4300; $d_4{}^{20}$=0.8426. In the U.V. this substance shows no typical absorption maximum. The 4-phenylsemicarbazone melts at 107–108° (from methanol).

U.V. maximum at 246 m$\mu$, $E^{1\%}_{1\,cm.}$=1095

The 6-methyl-4,5-heptadien-2-one used as the starting material can be obtained as follows:

172 g. of 2-methyl-3-butyn-2-ol, 800 ml. of petroleum ether, 0.4 g. of hydroquinone and 432 g. of isopropenyl methyl ether are added to a flask. While stirring, the mixture is treated with 0.2 g. of p-toluene-sulfonic acid. The reaction solution is boiled under reflux for 15–24 hours. After cooling, a solution of 0.2 g. of sodium acetate in 20 ml. of methanol is added to the reaction solution and the mixture is stirred for 10 minutes at room temperature. Thereafter, the entire mixture is evaporated in a water-jet vacuum at 40°. The evaporation residue is distilled under high vacuum. 239 g. of 6-methyl-4,5-heptadien-2-one are obtained as the main fraction; B.P. of the pure product: 70°/19 mm.; $n_D{}^{25}$=1.4630;

U.V. absorption at 280 m$\mu$; $E^{1\%}_{1\,cm.}$=24; $d_4{}^{20}$=0.8728

Example 2

9.6 g. of 6,10-dimethyl-4,5,9-undecatrien-2-one are diluted in 100 ml. of petroleum ether and, after the addition of 1 g. of Lindlar catalyst and 0.2 ml. of quinoline, the mixture is hydrogenated under normal conditions up to the cessation of hydrogen uptake (1.08 liters). The usual working up yields 9.7 g. of hydrogenation product ($n_D{}^{20}$=1.4702) which, on the basis of gas chromatographical analysis, contains 64.7% cis geranyl-acetone and 31.3% trans geranyl-acetone. The hydrogenation product is almost free from the isomeric β,γ-unsaturated ketone 6,10-dimethyl-4,9-undecadien-2-one.

The allene-ketone introduced as the starting material was prepared by the condensation of 3,7-dimethyl-6-octen-1-yn-3-ol (dehydro-linalool) with isopropenyl ether and was subjected to hydrogenation as a crude product.

Example 3

11 g. of 6,10,14-trimethyl-4,5,9,13-pentadecatetraen-2-one are dissolved in 110 ml. of petroleum ether and, after the addition of 2.2 g. of Lindlar catalyst and 0.5 ml. of quinoline, the mixture is hydrogenated under normal conditions until cessation of hydrogen uptake (1.03 liters). The usual working up yields 11.3 g. of a hydrogenation product ($n_D{}^{22}$=1.4889), which, on the basis of gas chromatographical analysis, contains 62.7% 5,6-cis farnesyl-acetone and 27% all-trans farnesyl-acetone.

The allene-ketone used as the starting material was obtained by the condensation of trans dehydro-nerolidol with isopropenyl ether and was subjected to hydrogenation as the crude product, $n_D{}^{24}$=1.4950 (melting point of the 4-phenylsemicarbazone, 58–60°).

Example 4

11.2 g. of 6,10-dimethyl-10-methoxy-4,5-undecadien-2-one are dissolved in 100 ml. of petroleum ether and, after the addition of 2 g. of Lindlar catalyst and 0.2 ml. of quinoline, the mixture is hydrogenated under normal conditions until cessation of hydrogen uptake (1.1 liters). The usual working up yields 11.1 g. of a hydrogenation product ($n_D{}^{23}$=1.4595), which, on the basis of gas chromatographical analysis, contains the cis and the trans form of 6,10-dimethyl-10-methoxy-5-undecen-2-one in a ratio of about 2:1.

The allene-ketone used as the starting material was obtained by the condensation of 3,7-dimethyl-7-methoxy-1-octyn-3-ol with isopropenyl methyl ether and was subjected to hydrogenation as the crude product, $n_D{}^{23}$=1.4711.

I claim:
1. A process for the prepartion of an olefinic ketone comprising treating an allene-ketone of the formula

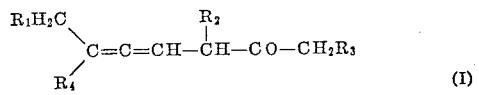

(I)

wherein $R_1$, $R_2$ and $R_3$ are selected from the group consisting of hydrogen and lower alkyl groups, $R_4$ is selected from the group consisting of alkyl, alkenyl, hydroxyalkyl, hydroxyalkenyl, lower-alkoxyalkyl, lower-alkoxyalkenyl, lower-alkanoyloxyalkyl, benzoyloxyalkyl, lower-alkanoyloxyalkenyl, benzoyloxyalkenyl, benzyl, phenyl, and $R_1$ and $R_4$ taken together stand for a member selected from the group consisting of trimethylene, tetramethylene and pentamethylene, with hydrogen in the presence of a hydrogenation catalyst selected from the group consisting of palladium/calcium carbonate poisoned with lead, palladium/carbon, palladium/barium sulfate, palladium/carbon poisoned with lead, palladium/barium sulfate poisoned with lead and Raney nickel until approximately 1 mole of hydrogen is reacted per mole of compound of Formula I to form a compound of the formula

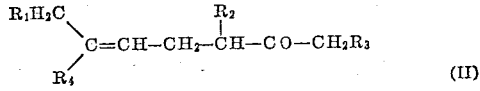

(II)

wherein $R_1$ through $R_4$ have the meanings given above.

2. A process according to claim 1, wherein the reaction is carried out in the presence of an organic solvent and at a temperature in the range of from about 0° C. to about 100° C. and a pressure in the range of from about atmospheric pressure to about 100 kg./cm.$^2$.

3. A process according to claim 1, wherein the treatment with hydrogen is carried out in the presence of an amine selected from the group consisting of aliphatic and aromatic amines.

4. A process according to claim 1 wherein $R_4$ is selected from groups of the formula

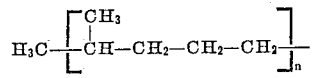

and groups of the formula

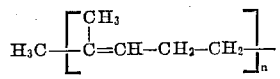

wherein $n$ is selected from 0, 1, and 2.

5. A process for the preparation of an olefinic ketone comprising treating an allene-ketone of the formula

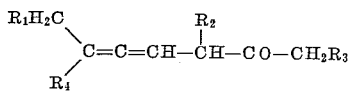

(I)

wherein $R_1$, $R_2$ and $R_3$ are selected from the group consisting of hydrogen and lower alkyl groups, and $R_4$ is selected from the group consisting of alkyl and alkenyl groups
with hydrogen in the presence of a hydrogenation catalyst selected from the group consisting of palladium/calcium carbonate poisoned with lead, palladium/carbon, palladium/barium sulfate, palladium/carbon poisoned with lead, palladium/barium sulfate poisoned with lead, and Raney-nickel in the presence of a nonpolar organic solvent and in the presence of a minor amount of an amine selected from the group consisting of aliphatic and aromatic amines at approximately room temperature and atmospheric pressure until approximately 1 mole of hydrogen is reacted per mole of allene-ketone of Formula I to form a compound of the formula

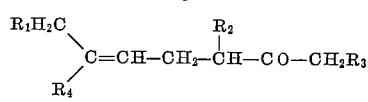

(II)

wherein $R_1$ through $R_4$ have the meanings given above.

6. 6,10-dimethyl-10-methoxy-5-undecen-2-one.

References Cited

UNITED STATES PATENTS

| | | | |
|---|---|---|---|
| 2,839,579 | 6/1958 | Kimel et al. | 260—595 |
| 2,928,881 | 3/1960 | Finch | 260—593 |
| 3,029,287 | 4/1962 | Marbet et al. | 260—593 |

FOREIGN PATENTS 1,137,008   9/1962   Germany.

OTHER REFERENCES

Maginiac, Ann. Chem. 7, 473 (July–August 1962).

LEON ZITVER, *Primary Examiner.*

DANIEL D. HORWITZ, *Examiner.*